K. ALQUIST.
GEARING.
APPLICATION FILED NOV. 20, 1917.

1,351,317.

Patented Aug. 31, 1920.

2 SHEETS—SHEET 1.

Inventor:
Karl Alquist,
by *Albert G. Davis*
His Attorney.

UNITED STATES PATENT OFFICE.

KARL ALQUIST, OF SCHENECTADY, NEW YORK.

GEARING.

1,351,317.   Specification of Letters Patent.   Patented Aug. 31, 1920.

Application filed November 20, 1917. Serial No. 203,064.

*To all whom it may concern:*

Be it known that I, KARL ALQUIST, a subject of the King of Sweden, residing at Schenectady, county of Schenectady, State of New York, have invented certain new and useful Improvements in Gearing, of which the following is a specification.

The present invention relates to gearing, and particularly to double reduction gearing of the type in which the load is transmitted from the driving shaft to the driven shaft through a plurality of sets of intermediate gear wheels which operate in parallel to transmit the load, each set comprising a high speed gear wheel and a low speed pinion mounted in fixed angular relation to each other on the same shaft. The high speed gear wheel and low speed pinion may be both fixed directly to the shaft, or one of them may be connected thereto through a suitable coupling which will permit of more or less axial adjustment.

The invention is applicable to gearing for either speed reduction or multiplication, but the more general field is for speed reduction, and as a matter of convenience the invention is described in connection with reduction gearing, but it will be understood that it is not necessarily limited thereto.

The object of my invention is to provide an improved arrangement or structure in a gearing of this type which will automatically take care of any slight inaccuracies in the bearing alinements, and in the tooth structure and maintain an equal division of the load between the sets of intermediate gear wheels.

One particular application of my improved gearing is for ship propulsion, the gearing being used to transmit power from an elastic fluid turbine or other prime mover or motor to a propeller shaft. However, it will be understood that it is not limited to this use.

For a consideration of what I believe to be novel and my invention, attention is directed to the accompanying specification and the claims appended thereto.

Figure 1:
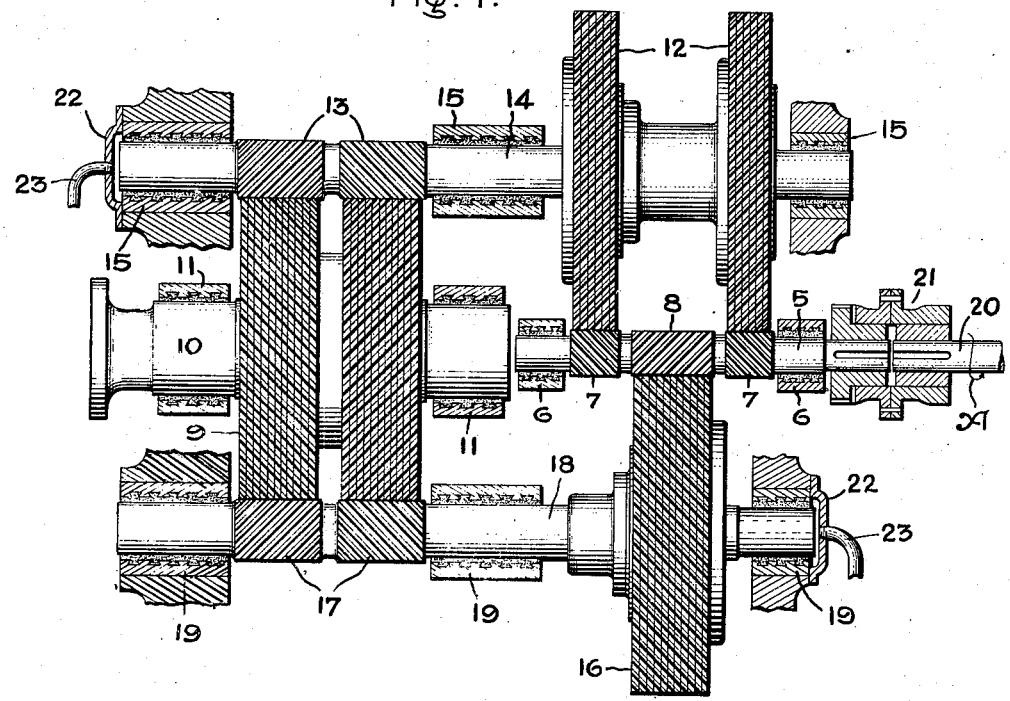
Figure 2:
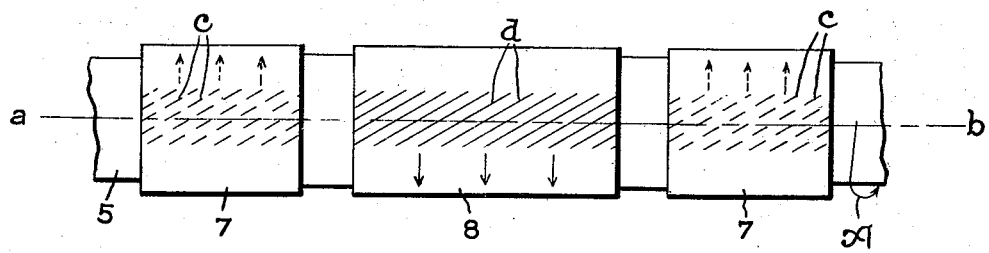
Figure 3:
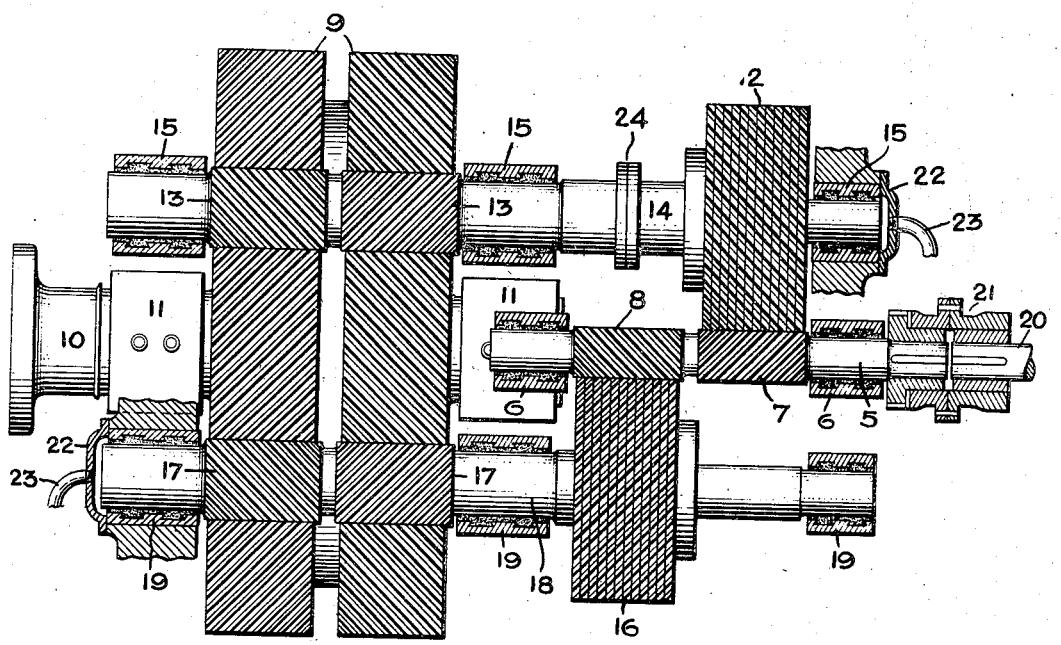

In the drawing, Figure 1 is a plan view of a gearing embodying my invention; Fig. 2 is an enlarged diagrammatic view of the high speed pinions which illustrates the operation of the invention, and Fig. 3 is a plan view of a slightly modified form of gearing.

Referring to the drawing, 5 indicates a high speed shaft carried in bearings 6 and having mounted thereon two pinion members 7 and 8. The pinion member 7 is shown as being formed in two parts, preferably halves, one placed on each side of pinion member 8. The purpose of this is to balance the pinion shaft 5 against turning moment in a plane through the centers of the pinion members and the wheels meshing therewith. The two parts of pinion member 7 are alike as to their tooth structures, both parts having teeth which run in the same direction, being either right-hand or left-hand. In other words, the two parts of pinion member 7 form a pinion member of the single helical type. The pinion member 8 is likewise of the single helical type, but has its teeth cut in a direction opposite to that of pinion member 7; i. e., one pinion member has right-hand helical teeth and the other left-hand helical teeth. By single helical type I mean a pair of meshing gear wheels having helical teeth which run in one direction, being either right-hand or left-hand. From a structural standpoint, the two pinion members 7 and 8 when taken together form what is ordinarily termed a pinion of the double helical or herringbone type, except that one part is divided and placed on opposite sides of the other. However, in the present case, as each pinion member meshes with a separate gear wheel, it is thought that the invention will be best understood by considering them as being two separate pinions one of which in the arrangement shown in Fig. 1 is formed in two parts placed on opposite sides of the other, and hereinafter they are referred to as such. 9 indicates a low speed gear wheel mounted on a shaft 10 carried in bearings 11. Power is transmitted from the pinion 7 to the low speed gear wheel 9 by a set of intermediate gear wheels comprising a high speed gear wheel 12 which meshes with pinion 7, and a low speed pinion 13 which meshes with gear wheel 9, the gear wheel 12 and pinion 13 being mounted on a common shaft 14 carried in bearings 15, and the gear wheel 12 being formed in two parts corresponding to the two parts of pinion 7. Power is transmitted from the pinion 8 to the low speed gear wheel 9 by a set of intermediate gear wheels comprising a high speed wheel 16 which meshes with pinion 8 and a low speed pinion 17 which meshes with gear wheel 9, the gear wheel 16 and pinion 17 being mounted on a common shaft 18 carried in bearings 19. It will thus be seen that power is transmitted from the two pinions 7 and 8 on the driving shaft 5 to the driven gear wheel 9 through two sets of intermediate gear wheels which transmit the load in parallel, and it will furthermore be clear that the arrangement forms a double reduction gearing.

The low speed end of the gearing; i. e., the low speed pinions 13 and 17, and the low speed wheel 9, may be of any suitable type, but is preferably of the double or herring bone type of helical gearing. The high speed end of the gearing, as already stated, is of the single helical type and the axial thrust of the two wheels 12 and 16 will be in opposite directions, as is obvious. Between each of the gear wheels and their bearings a suitable clearance is provided to permit the wheels to adjust themselves axially, as is well understood in connection with this type of gearing. 20 indicates a driving shaft coupled to the shaft 5 by a suitable coupling 21 which permits of axial adjustment of the shafts.

The arrangement described makes possible a perfect division of load between the two intermediate sets of gear wheels 12, 13 and 16, 17.

This will be understood by reference to Fig. 2. In this figure the pinions 7 and 8 are to be considered as being shown in side elevation, the line $a\ b$ indicating a plane through the pitch lines; i. e., the lines of engagement between the teeth of pinions 7 and 8 and the teeth of gear wheels 12 and 16. The gear wheels 12 and 16 engage the pinions 7 and 8 respectively on opposite sides of the shaft 5, and in Fig. 2 the dotted lines $c$ indicate the teeth on the far side of pinion 7 with which the teeth of wheel 12 are in engagement, and the full lines $d$ indicate the teeth on the near side of pinion 8 with which the teeth of the wheel 16 engage. Lines to indicate the teeth on the near side of pinion 7 and on the far side of pinion 8 have been omitted for the purpose of clearness. It will be seen that the lines $c$ and $d$ are parallel which means that the teeth $c$ on one side of pinion 7 and the teeth $d$ on the opposite side of pinion 8 are parallel at all points of intersection with the plane $a—b$, and hence all the points of engagement between pinions 7 and 8 and gear wheels 12 and 16 are located in parallel planes. Due to this, all adjustments required to obtain correct engagement of the teeth and equal division of the load between the two intermediate sets of gear wheels can be effected by the pinions 7 and 8 moving endwise, or turning, or both. For instance, if the wheels 12 and 16 are stationary and the shaft 5 is moved endwise relatively thereto, the pinions 7 and 8 will be raised or lowered, their teeth sliding up or down the teeth of wheels 12 and 16. In assembling the gearing, therefore, the pinion can adjust itself to the level of its bearings by an endwise movement. In other words, even if the bearings of shaft 5 are somewhat above or below the true center line, it will not affect the meshing of the pinions 7 and 8 with the wheels 12 and 16, for the shaft 5 by an endwise movement can adjust itself to the level of its bearings, the teeth of the pinions 7 and 8 sliding up or down the teeth of gear wheels 12 and 16.

Again, when the shaft 5 is resting in its bearings, if the teeth of either pinions 7 or 8 engage the teeth of its wheel 12 or 16, but the teeth of the other pinion does not engage the teeth of its wheel, they can be both brought into engagement with the teeth of wheels 12 and 16 respectively by a combined endwise and turning movement of shaft 5. This will be understood from the following consideration; Assume that the pinion shaft 5 turns counter-clockwise as indicated by the arrow A in Figs. 1 and 2. The teeth of pinion 7 which are in engagement at the pitch line with wheel 12 move up, as indicated by the small dotted arrows, (Fig. 2) while those of the pinion 8 which are in engagement at the pitch line with the wheel 16 move down, as indicated by the full line arrows (Fig. 2). A movement of the shaft 5 axially toward the left will accordingly move the teeth of pinion 7 toward engagement with the teeth of wheel 12, and the teeth of pinion 8 away from engagement with the teeth of wheel 16, and a movement of the shaft 5 toward the right will produce the opposite effect. Accordingly, if, for example, the teeth of pinion 7 are in engagement with the teeth of the gear wheel 12, but the teeth of pinion 8 are not in engagement with the teeth of gear wheel 16, an axial movement of the shaft 5 toward the right coupled with a turning movement in the direction of rotation, as indicated by arrow A, will bring the teeth of both of the pinions into engagement with the teeth of the respective wheels 12 and 16.

On the other hand, if the teeth of pinion 8 are in engagement with the teeth of gear wheel 16, but the teeth of pinion 7 are not in engagement with the teeth of gear wheel 12, then an axial movement of shaft 5 toward the left coupled with a turning movement in the direction of rotation as indicated by arrow A will again bring the teeth of the pinions into engagement with the teeth of their respective wheels 12 and 16. When the gearing is running, assuming the direction of rotation to be counterclockwise as indicated by the arrow A in Fig. 1, the axial thrust on gear wheel 12 due to the pinion 7, is toward the left, and that on gear wheel 16 due to pinion 8, is toward the right. That is, they are in opposite directions, as already stated. The values of these axial thrusts depend on the loads which the respective wheels 12 and 16 are transmitting, and when such loads are equal the axial thrusts are equal, so that the shaft 5 is balanced against axial movement. If the loads which the two wheels 12 and 16 are transmitting become unequal; i. e., the total load becomes unequally divided between the two sets of intermediate gear wheels, then the axial thrusts on wheels 12 and 16 become unequal, which causes an axial movement of the pinion shaft 5 in one direction or the other, as described above, to bring about equal engagement between the pinions 7 and 8 and wheels 12 and 16, and hence equal division of the load. Such an inequality in the division of the load may be caused due to slight inaccuracies in the gear teeth or in the bearing alinements. Inaccuracies in the bearing alinements may be due to their not having been exactly alined originally or may be occasioned, for example, by wear, or by a twisting of the gearing casing. This latter is particularly likely to occur where the gearing is located on a ship due to the strains to which the ship is subjected in operation. In this connection it will be noted that the axial positions of wheels 12 and 16 are fixed by the low speed pinions 13 and 17 which engage low speed wheel 9, so that wheels 12 and 16 can only be shifted axially due to an axial movement of low speed pinions 13 and 17. Such a movement may be caused, for example, by a slight inaccuracy in the driven gear wheel 9, or in pinions 13 and 17. When such movement occurs it, of course, disturbs the meshing of gear wheels 12 and 16 with pinions 7 and 8 and causes a momentary inequality in the distribution of the load between the two sets of intermediate gear wheels which is instantly righted by a shifting of pinions 7 and 8, as already explained.

From a consideration of the foregoing it will be seen that any small deviation from the true position of the gear wheels which may take place while the gearing is running, and which may result in unequal meshing between pinions 7 and 8 and gear wheels 12 and 16 respectively, and unequal division of the load, can be taken care of by a movement of the pinion shaft 5. It will be appreciated, of course, that the movements of pinion shaft 5 are very slight and that during operation of the gearing such movements are continually taking place. Correct meshing of the gear wheels and equal division of the load between the two intermediate sets of gear wheels is accordingly always assured.

The arrangement described, as stated above, creates an axial thrust in opposite directions on the two sets of intermediate gear wheels, which thrusts may be taken up by the low speed gear wheel 9 when such gear wheel is of the double helical type. The effect of this would be to produce an unequal division of the load between the two halves of the low speed pinions 13 and 17. This inequality in the division of the load would not in any case be great. If found desirable, it may be removed partly or completely by the use of external pressure on the ends of shafts 14 and 18 in a direction to oppose such axial thrusts. As a suitable means for this I have shown a cap 22 located over an end of each of shafts 14 and 18 to which fluid pressure, for example, oil under pressure, is applied by a pipe 23.

In case the wheels 12 and 16 are connected to shafts 14 and 18 by couplings which permit of axial adjustment of these wheels, then suitable balancing means or thrust collars may be associated with wheels 12 and 16 to balance them.

In assembling a gearing as described it may sometimes be desirable to angularly adjust one of the gear wheels 12 or 16 relative to the pinions 13 or 17 which is on the same shaft therewith in order to obtain correct axial positions of the pinions 7 and 8 for meshing with the gear teeth of wheels 12 and 16, and I may provide for this purpose a suitable coupling in one of the shafts 14 or 18, which will permit of such an adjustment being made. Such a coupling is indicated at 24 in Fig. 3, being located in the shaft 14.

My invention may be carried out in connection with gearing as described in which the individual gear wheels are formed in various ways, but I have illustrated the invention as applied to gearings in which all or certain of the gear wheels are of the elastic type invented by me wherein a wheel is made up of a plurality of disks, plates, or laminæ fixed at their central portions on a common support or shaft and slightly spaced apart at their peripheries to permit of axial yielding under tooth pressure. In Fig. 1 gear wheels 12, 16 and 9 are shown as being of this type.

In Fig. 1 the center lines of the gear wheels and shafts all lie in the same plane, the shafts 5 and 10 being in axial alinement and the low speed pinions located at points on the gear wheel 9 which are diametrically opposite each other. This forms what may be termed a one-plane type of gearing, the center lines of all the bearings lying in the same plane.

In Fig. 3 is shown a modified arrangement in which the bearings for the low speed wheel are located in a plane other than that in which the remaining bearings are located so that the driving and driven shafts are not in axial alinement. The general arrangement and the operation of the gearing of Fig. 3 is the same as that of Fig. 1, and the same reference numerals have been applied to corresponding parts. The two low speed pinions 13 and 17 are an angular distance apart, considerably less than 180°. This arrangement has the advantage that the bearings for the inner ends of shafts 5 and 10 may be arranged in the same or nearly the same vertical transverse plane so that they overlap each other. This gives a compact structure having a shorter over-all length than otherwise. In this arrangement only the wheels 12 and 16 are preferably of the elastic type, the wheel 9 being solid.

In Fig. 3 I have also shown the pinion 7 as being a continuous member, that is, not divided into two parts placed on opposite sides of pinion 8, as in Fig. 1. This arrangement, while a satisfactory one, has the disadvantage that it subjects the shaft 5 to a force tending to turn it in a plane through the centers of pinions 7 and 8 and gear wheels 12 and 16, and I accordingly prefer the divided arrangement of the pinion members 7 and 8, as shown in Fig. 1. It will be understood, however, that the arrangement of Fig. 3 may be used where found desirable.

The broad generic invention disclosed in this application is not claimed herein but is claimed in my copending application Serial No. 241,347, filed June 22, 1918.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by any other means.

What I claim as new and desire to secure by Letters Patent of the United States, is:—

1. In a gearing, the combination of a high speed shaft having pinion members thereon, part of which have right hand helical teeth and part of which have left hand helical teeth, a low speed gear, intermediate speed shafts located on opposite sides of said high speed shaft, gear wheels on one of said intermediate speed shafts which transmits power from said right hand helical pinion part only to said low speed gear, and gear wheels on another of said intermediate speed shafts which transmits power from said left hand helical pinion part only to said low speed gear.

2. In a gearing, the combination of a high speed shaft having two helical pinion members thereon, one of which has right-hand teeth and the other left-hand teeth, a low speed gear wheel, a set of intermediate gear wheels which transmits load between one of said pinion members only and the low speed gear wheel, and a second set of intermediate gear wheels which transmits load between the other pinion member only and the low speed gear wheel, the gear wheels which engage the pinion members being located on opposite sides of the high speed shaft.

3. In a gearing, the combination of a high speed shaft having two gearing members thereon, one of which has right-hand helical teeth and the other left-hand helical teeth, a low speed gear wheel, and two sets of intermediate gear wheels which transmit the load between said gearing members and the low speed gear wheel, each of said intermediate sets comprising a low speed pinion which meshes with the low speed gear wheel and a high speed gear wheel having single helical teeth, one of said high speed wheels meshing with one of said gearing members on one side of the high speed shaft, and the other with the other of said gearing members on the opposite side of the high speed shaft, whereby one of said sets of intermediate gear wheels transmits power between said right hand helical gearing member only and said low speed gear wheel, and the other set transmits power between said left hand helical gearing member only and said low speed gear wheel.

4. In a gearing, the combination of a high speed shaft, two pinion members thereon, one of which has right-hand helical teeth and the other left-hand helical teeth, one of said pinion members being formed in two parts which are located on opposite sides of the other, a low speed gear wheel, and two sets of intermediate gear wheels which transmit power between said pinion members and the low speed gear wheel, each of said sets comprising a gear wheel which engages one of said pinion members and a pinion engaging the low speed gear wheel, said gear wheels which engage the pinion members being located on opposite sides of the high speed shaft.

5. In a gearing, the combination of a high speed shaft having two gearing members thereon, one of which has right-hand helical teeth and the other left-hand helical teeth, a low speed gear wheel having double helical teeth thereon, and two sets of intermediate gear wheels which transmit the load from said gearing members to said low speed gear wheel, each of said intermediate sets comprising a low speed pinion having double helical teeth which mesh with the low speed gear wheel and a high speed gear wheel having single helical teeth, one of said high speed gear wheels meshing with one only of said gearing members on one side of the high speed shaft and the other meshing with the other only of said gearing members on the opposite side of the high speed shaft, whereby one of said sets of intermediate gear wheels transmits power between said right hand helical gearing member only and said low speed gear wheel, and the other set transmits power between said left hand helical gearing member only and said low speed gear wheel.

6. In a gearing, the combination of a high speed shaft having two gearing members thereon, one of which has right-hand helical teeth and the other left-hand helical teeth, a low speed gear wheel having double helical teeth thereon, and two sets of intermediate gear wheels which transmit the load from said gearing members to said low speed gear wheel, each of said intermediate sets comprising a low speed pinion having double helical teeth which mesh with the low speed gear wheel and a high speed gear wheel having single helical teeth, one of said high speed gear wheels meshing with one of said gearing members on one side of the high speed shaft and the other meshing with the other of said gearing members on the opposite side of the high speed shaft, and means for balancing the axial thrust of said intermediate sets of gear wheels.

7. In a gearing, the combination of a high speed shaft having two helical pinions thereon, one of which has right-hand teeth and the other left-hand teeth, a low speed gear wheel, a set of intermediate gear wheels which transmits load between one of said pinions and the low speed gear wheel, and a second set of intermediate gear wheels which transmits load between the other pinion and the low speed gear wheel, the gear wheels which engage the pinions being located on opposite sides of the high speed shaft, and means whereby the gear wheels of one of said intermediate sets may be adjusted angularly relatively to each other.

8. In a gearing, the combination of a high speed shaft having two gearing members thereon, one of which has right-hand helical teeth and the other left-hand helical teeth, a low speed gear wheel, and two sets of intermediate gear wheels which transmit the load between said gearing members and the low speed gear wheel, each of said intermediate sets comprising a low speed pinion which meshes with the low speed gear wheel and a high speed elastic gear wheel having single helical teeth, one of said high speed wheels meshing with one only of said gearing members on one side of the high speed shaft, and the other with the other only of said gearing members on the opposite side of the high speed shaft.

9. In a gearing, the combination of a high speed shaft having two gearing members thereon, one of which has right-hand helical teeth and the other left-hand helical teeth, a low speed gear wheel, and two sets of intermediate gear wheels which transmit the load between said gearing members and the low speed gear wheel, each of said intermediate sets comprising a low speed pinion which meshes with the low speed gear wheel and a high speed gear wheel having single helical teeth, one of said high speed wheels meshing with one only of said gearing members on one side of the high speed shaft, and the other with the other only of said gearing members on the opposite side of the high speed shaft, said high speed gear wheels being of an elastic type comprising a plurality of disks clamped together at their central portions and slightly spaced apart at their peripheries.

10. In a gearing, the combination of a high speed shaft having two gearing members thereon, one of which has right-hand helical teeth and the other left-hand helical teeth, a low speed shaft having a gear wheel thereon, bearings for said shafts, the adjacent bearings of said shafts being located one above the other, and two sets of intermediate gear wheels which transmit the load between said gearing members and the low speed gear wheel, each of said intermediate sets comprising a shaft carrying a low speed pinion which meshes with the low speed gear wheel and a high speed gear wheel having single helical teeth, one of said high speed wheels meshing with one only of said gearing members on one side of the high speed shaft, and the other with the other only of said gearing members on the opposite side of the high speed shaft, and bearings for the shafts of said intermediate sets the center lines of which lie in the same plane as the center line for the bearings of the high speed shaft.

11. In a gearing, the combination of a high speed shaft, two pinion members thereon, one of which has right hand helical teeth and the other left hand helical teeth, one of said pinion members being formed in two parts which are located on opposite sides of the other, a low speed gear wheel, and two sets of intermediate gear wheels which transmit power between said pinion members and the low speed gear wheel, each of said sets comprising a gear wheel which engages one of said pinion members and a pinion engaging the low speed gear wheel.

12. In a gearing, the combination of a high speed shaft having two pinion members thereon, a low speed gear wheel, a set of intermediate gear wheels which transmits load between one only of said pinion members and said low speed gear wheel, and a second set of intermediate gear wheels which transmits load between the other only of said pinion members and said low speed gear wheel.

13. In a gearing, the combination of a high speed shaft, two pinion members thereon, a low speed gear wheel, and two sets of intermediate speed gear wheels which transmit power between said pinion members and the low speed gear wheel, each of said sets comprising a gear wheel which engages one only of said pinion members and a pinion engaging the low speed gear wheel, whereby one of said sets of intermediate gear wheels transmits power from one only of said pinion members to the low speed gear wheel, and the other of said sets transmits power from the other only of said pinion members to the low speed gear wheel.

14. In a gearing, the combination of a high speed shaft, two pinion members thereon, a low speed gear wheel, and two sets of intermediate gear wheels which transmit power between said pinion members and the low speed gear wheel, each of said sets comprising a gear wheel which engages one only of said pinion members and a pinion engaging the low speed gear wheel, said gear wheels which engage the pinion members being located on opposite sides of the high speed shaft.

15. In a gearing, the combination of a high speed shaft, two helical pinion members mounted thereon, a low speed shaft, a low speed gear wheel thereon, an intermediate speed shaft, a high speed gear wheel on said intermediate speed shaft which engages one only of said pinion members, a low speed pinion member on said last named shaft which engages said low speed gear wheel, a second intermediate speed shaft, a high speed gear wheel thereon which engages the other only of said pinion members, and a low speed pinion on such last named shaft which engages said low speed gear wheel.

In witness whereof, I have hereunto set my hand this 13th day of November, 1917.

KARL ALQUIST.